US 6,626,546 B2

(12) United States Patent
Grier et al.

(10) Patent No.: US 6,626,546 B2
(45) Date of Patent: Sep. 30, 2003

(54) APPARATUS FOR USING OPTICAL TWEEZERS TO MANIPULATE MATERIALS

(75) Inventors: David G. Grier, Chicago, IL (US); Eric R. Dufresne, Arlington, VA (US); Jennifer E. Curtis, Chicago, IL (US); Brian A. Koss, Chicago, IL (US)

(73) Assignee: University of Chicago, Chicago, IL (US)

( * ) Notice: Subject to any disclaimer, the term of this patent is extended or adjusted under 35 U.S.C. 154(b) by 0 days.

(21) Appl. No.: 10/186,807

(22) Filed: Jul. 1, 2002

(65) Prior Publication Data

US 2002/0181113 A1 Dec. 5, 2002

Related U.S. Application Data

(62) Division of application No. 09/845,045, filed on Apr. 27, 2001, now Pat. No. 6,416,190.

(51) Int. Cl.$^7$ ............................................. G02B 27/00
(52) U.S. Cl. .................. 359/614; 359/615; 359/601; 359/613
(58) Field of Search ................... 359/614, 601, 359/613, 615, 350, 361, 368, 9, 15, 16, 19, 20, 27, 558, 556, 571, 434; 349/201, 202

(56) References Cited

U.S. PATENT DOCUMENTS

| | | | |
|---|---|---|---|
| 5,079,169 A | * | 1/1992 | Chu et al. ................... 436/174 |
| 5,198,369 A | | 3/1993 | Itoh et al. ................... 436/534 |
| 5,245,466 A | | 9/1993 | Burns et al. ................ 359/296 |
| 5,430,308 A | * | 7/1995 | Feichtner et al. ........... 250/580 |
| 5,512,745 A | | 4/1996 | Finer et al. ................ 250/251 |
| 5,776,674 A | | 7/1998 | Ulmer .......................... 435/6 |
| 6,055,106 A | | 4/2000 | Grier et al. ................ 359/566 |
| 6,139,831 A | | 10/2000 | Shivashankar et al. .. 424/82.05 |
| 6,177,686 B1 | * | 1/2001 | Gutierrez-Aitken ......... 257/22 |
| 6,416,190 B1 | | 7/2002 | Grier et al. ................ 359/614 |

OTHER PUBLICATIONS

David G. Grier, *Using Optical Tweezers to Manipulate Biological Samples*, Apr. 21, 2001, The University of Chicago, Department of Physics, pp. 1–5.

Kevin M. Joyce et al., *Visible Light Inhibits Proliferation of the Human Monoblastic U937 Cell Line*, Feb. 25, 1997, Biomechanical Society Transactions, p. 25.

* cited by examiner

*Primary Examiner*—Mohammad Sikder
(74) *Attorney, Agent, or Firm*—Foley & Lardner

(57) ABSTRACT

A method and apparatus for control of optical trap arrays and formation of particle arrays using light that is in the visible portion of the spectrum. The method and apparatus provides a laser and a time variable diffractive optical element to allow dynamic control of optical trap arrays and consequent control of particle arrays and also the ability to manipulate singular objects using a plurality of optical traps. By avoiding wavelengths associated with strong absorption in the underlying material, creating optical traps with a continuous-wave laser, optimizing the efficiency of individual traps, and trapping extended samples at multiple points, the rate of deleterious nonlinear optical processes can be minimized.

25 Claims, 9 Drawing Sheets

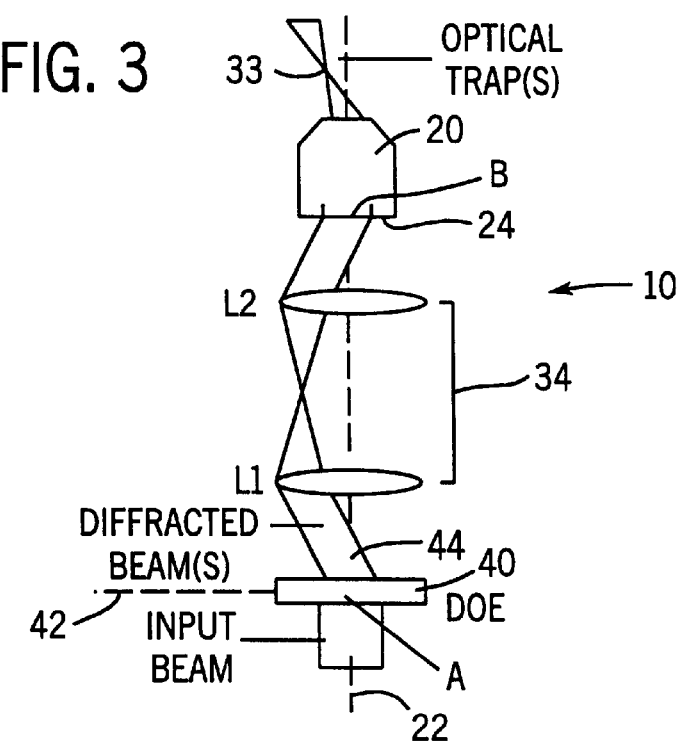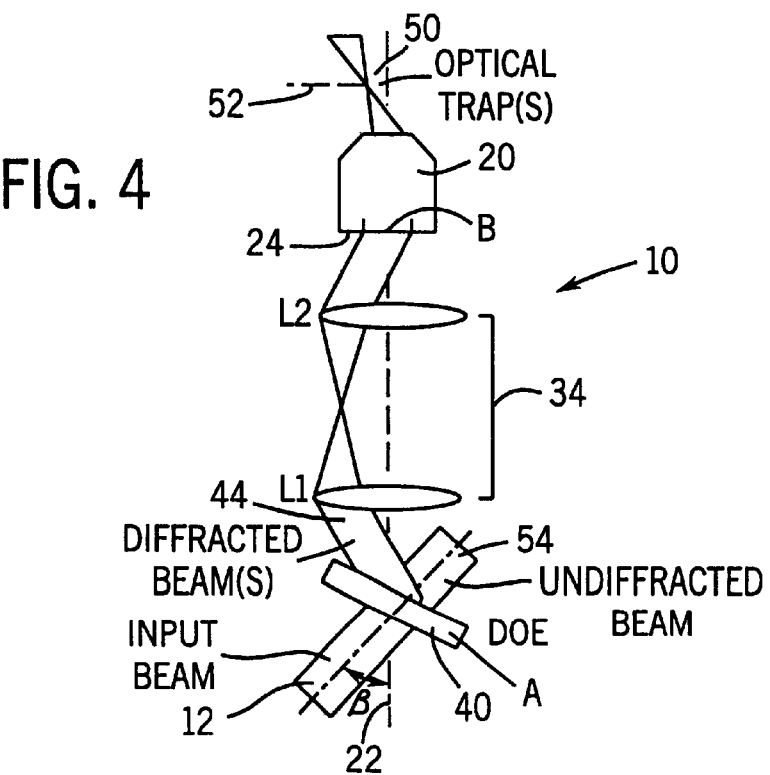

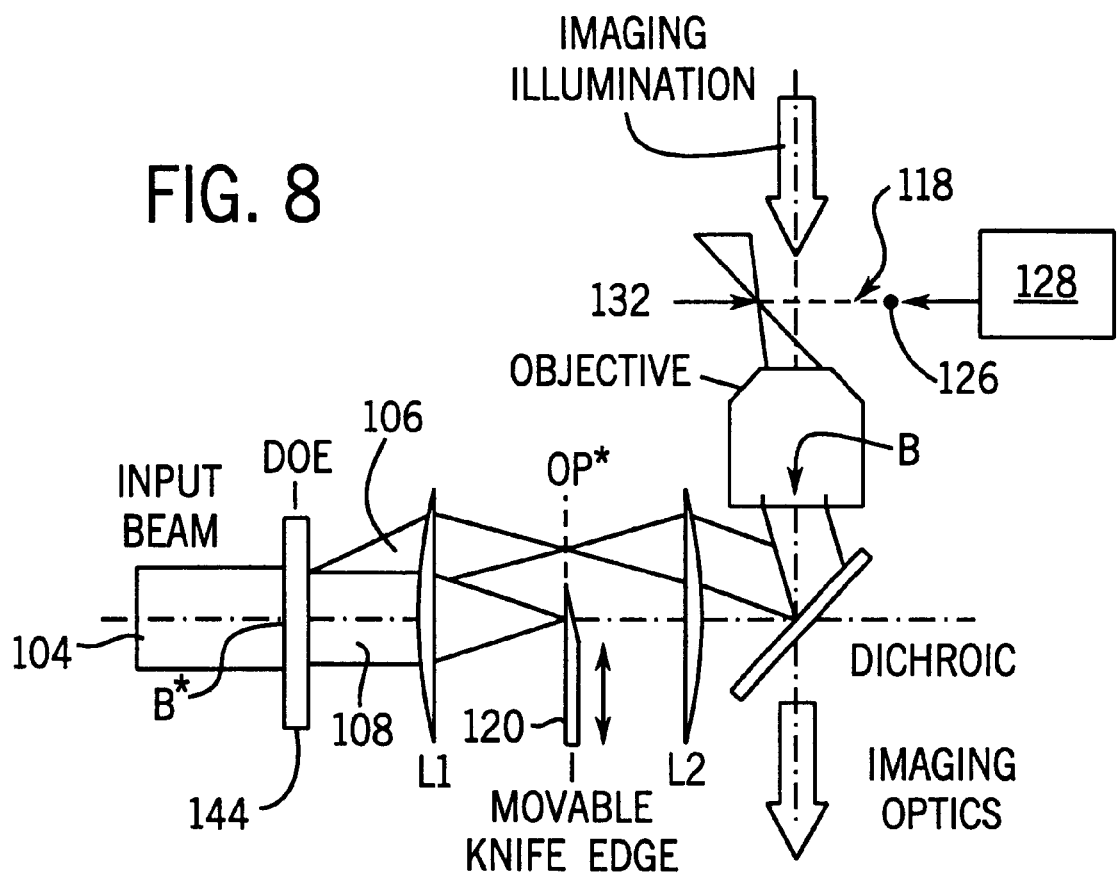

APPARATUS FOR USING OPTICAL TWEEZERS TO MANIPULATE MATERIALS

This application is a division of U.S. Pat. No. 09/845,045 filed on Apr. 27, 2001 and now U.S. Pat. No. 6,416,190.

This invention was made with U.S. Government support under Contract No. DMR-9730189 awarded by the National Science Foundation, through the MRSEC Program of the National Science Foundation under Award No. DMR-9808595, and through a GAANN fellowship from the Department of Education. The U.S. Government also has certain rights to the invention.

The present invention is directed generally to a method and apparatus for control of optical traps or optical tweezers. More particularly, the invention is directed to optical tweezers formed using visible light that can be used to manipulate a variety of light sensitive materials, such as living biological materials, without substantial damage or deleterious effects upon the material being investigated or manipulated.

It is known to construct optical tweezers using optical gradient forces from a single beam of light to manipulate the position of a small dielectric particle immersed in a fluid medium whose refractive index is smaller than that of the particle. The optical tweezer technique has been generalized to enable manipulation of reflecting, absorbing and low dielectric constant particles as well.

Some systems have therefore been developed which can manipulate a single particle by using a single beam of light to generate a single optical trap. To manipulate multiple particles with such systems, multiple beams of light must be employed. The difficulty of creating extended multiple-beam traps using conventional optical tweezer methodology inhibits their use in many potential commercial applications such as the inspection of biological materials generally, and also the fabrication and manipulation of nanocomposite materials including electronic, photonic and opto-electronic devices, chemical sensor arrays for use in chemical and biological assays, and holographic and computer storage matrices.

An optical tweezer uses forces exerted by an intense and tightly focused beam of light to trap and manipulate dielectric particles, typically in fluid media. Prior descriptions of optical tweezers emphasized their potential utility for biological applications such as capturing cells, or their components, for research, diagnostic evaluation, and even therapeutic purposes. These same reports also emphasized the inherent and persistent occurrence of damage or changes caused by optical trapping methods when using visible light. In particular, it has been observed that green light of wavelength $\lambda=514.5$ nm from an Ar ion laser has caused various deleterious effects on biological material: red blood cells literally explode, the chloroplasts of green plant cells were destroyed, and the continued application of a green laser light has caused the death of trapped ciliated bacteria. Damage from the green laser light in the first two examples clearly resulted from strong absorption of green light by hemoglobin and chlorophyll, respectively, leading to rapid heating and catastrophic destruction. The mechanism of the third type of damage, dubbed "opticution" by those in the art, was not immediately obvious. Subsequent studies have identified optically-induced mutagensis to be a likely mechanism for the cells' death by virtue of the use of optical tweezers.

Considerably less damage to biological materials was observed when comparable materials were optically trapped with infrared light from a Nd:YAG laser operating at $\lambda=1064$ nm. Largely on the basis of these and similar early observations with a single optical tweezer, researchers came to the conclusion that infrared illumination is operationally superior to visible illumination for optically trapping biological materials. That is, use of infrared light did not cause any apparent deleterious effect upon biological material.

Laser-induced damage can be desirable, however, in special circumstances. For example, pulsed optical tweezers operating at $\lambda=532$ nm have been singled out for their ability to cut biological materials, such as chromosomes. Optical tweezers used in this way are known as optical scissors or optical scalpels. Even so, the prospects for nondestructively trapping biological materials with visible light had previously been considered by those in the art to be an unacceptable method of optical trapping and manipulation due to the well documented and accepted deleterious effect on biological material.

It is therefore an object of the invention to provide an improved method and system for using at least one optical trap from light in the visible or ultraviolet portion of the spectrum.

It is also an object of the invention to provide a novel method and apparatus for control of visible light optical traps that has an increased level of efficiency, effectiveness and safety for use.

It is yet another object of the invention to provide a novel method and apparatus for control of visible light optical traps that is relatively simple to align by virtue of using light visible to the human eye.

It is still a further object of the invention to provide a novel method and apparatus for control of visible light optical traps where localized regions can be accurately trapped.

It is an additional object of the invention to provide a novel method and apparatus for control of visible light optical traps wherein the samples being manipulated are not overly heated or otherwise altered due to light absorption.

It is yet a further object of the invention to provide a novel method and apparatus for control of optical traps wherein the optical traps have highly improved tracking accuracy.

It is an another object of the invention to provide a novel method and apparatus for using visible light for optical tweezers for use on any material whose electronic, mechanical, chemical or biological state is highly sensitive to optical tweezers having a high intensity light pattern.

It is still another object of the invention to provide a novel method and apparatus for control of optical traps with a variable power level which provides efficient optical trapping but without alteration of the desired chemical, biological, electronic or mechanical state of the material.

In accordance with the above objects, it has been discovered that damage or unwanted alterations inflicted by visible optical tweezers on biological matter, and other materials sensitive to high intensity light, can be reduced to acceptable, de minimis or even zero dimensions and levels, in part through appropriate design of the optical trapping system and method. In addition, it is believed that wavelengths in the ultraviolet can also be used for particular small size objects and particular types of materials by taking advantage of the features of this invention. Consequently, such optical tweezers can have widespread applications in biological systems and other systems having light sensitive materials and possess a number of advantages over infrared optical tweezers.

Other objects, features and advantages of the present invention will be readily apparent from the following

BRIEF DESCRIPTION OF THE DRAWINGS

FIG. 3 illustrates a method and system using a diffractive optical element;

FIG. 4 illustrates another method and system using a tilted optical element relative to an input light beam;

FIG. 8 illustrates a method and system for manipulating particles using an optical tweezer array while also accelerating the filling of optical traps;

DETAILED DESCRIPTION OF THE PREFERRED EMBODIMENTS

Figure 1:
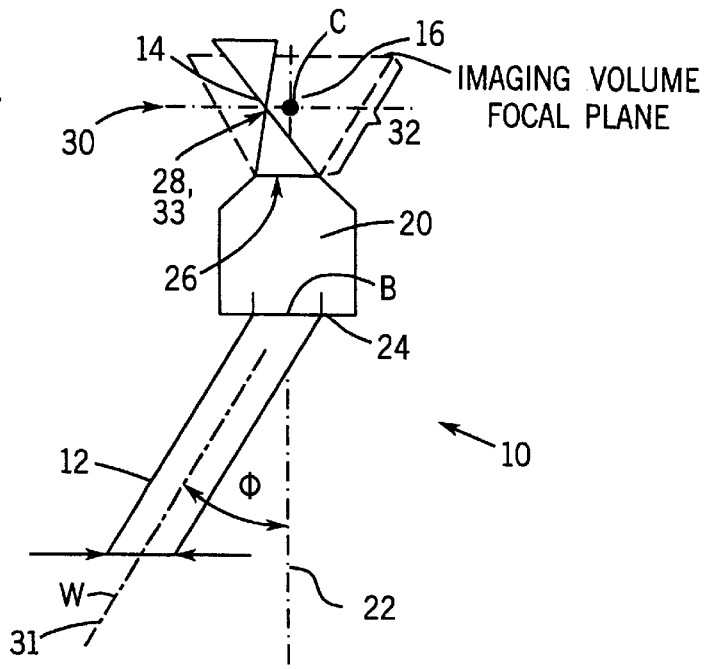
FIG. 1 illustrates a method and system which includes some conventional features for a single optical tweezer.
Figure 2:
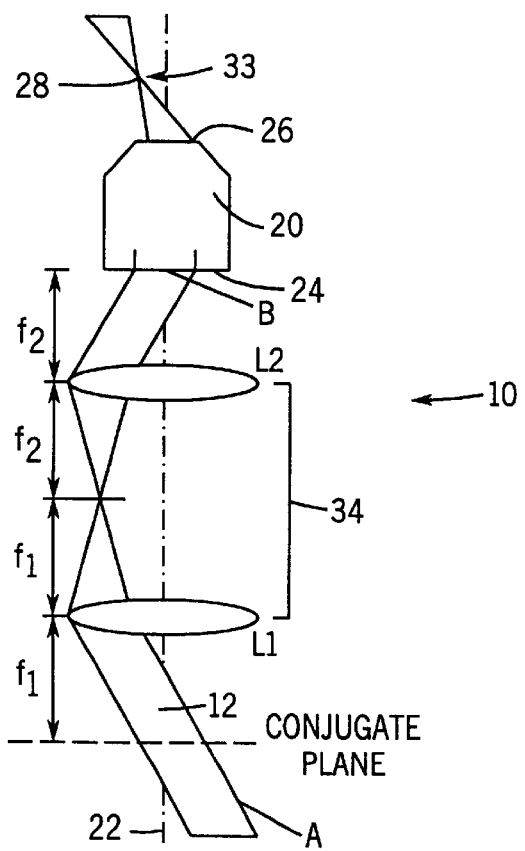
FIG. 2 illustrates a method and system which includes some conventional features for a single, steerable optical tweezer.

In order to best understand the improvement of the invention, FIGS. 1 and 2 illustrate several methods and systems which include some conventional features. In an optical tweezer system 10 of FIG. 1, optical gradient forces arise from use of a single beam of light 12 to controllably manipulate a small dielectric particle 14 dispersed in a medium 16 whose index of refraction, $n_m$, is smaller than that of the particle 14. The fundamental nature of the optical gradient forces is well known, and also it is understood that the principle has been generalized to allow manipulation of reflecting, absorbing and low dielectric constant particles as well. Any of these techniques can be implemented in the context of the invention improvements described hereinafter and will be encompassed by use of the terminology optical tweezer, optical trap and optical gradient force trap hereinafter.

The optical tweezer system 10 is applied by using a light beam 12 (such as a laser beam or other very high intensity light sources) capable of applying the necessary forces needed to carry out the optical trapping effect needed to manipulate a particle. The objective of a conventional form of the optical tweezer 10 is to project one or more shaped beams of light into the center of a back aperture 24 of a converging optical element (such as an objective lens 20). As noted in FIG. 1 the light beam 12 has a width "w" and having an input angle Ø relative to an optical axis 22. The light beam 12 is input to a back aperture 24 of the objective lens 20 and output from a front aperture 26 substantially converging to a focal point 28 in focal plane 30 of imaging volume 32 with the focal point 28 coinciding with an optical trap 33. In general, any focusing optical system can form the basis for the optical tweezer system 10.

In the case of the light beam 12 being a collimated laser beam and having its axis coincident with the optical axis 22, the light beam 12 enters the back aperture 24 of the objective lens 20 and is brought to a focus in the imaging volume 32 at the center point c of the objective lens focal plane 30. When the axis of the light beam 12 is displaced by the angle Ø with respect to the optical axis 22, beam axis 31 and the optical axis 22 coincide at the center point B of the back aperture 12. This displacement enables translation of the optical trap across the field of view by an amount that depends on the angular magnification of the objective lens 20. The two variables, angular displacement Ø and varying convergence of the light beam 12, can be used to form the optical trap at selected positions within the imaging volume 32. A multiple number of the optical traps 33 can be arranged in different locations provided that multiple beams of light 12 are applied to the back aperture 24 at the different angles Ø and with differing degrees of collimation.

In order to carry out optical trapping in three dimensions, optical gradient forces created on the particle to be trapped must exceed other radiation pressures arising from light scattering and absorption. In general this necessitates having the wave front of the light beam 12 to have an appropriate shape at the back aperture 24. For example, for a Gaussian $TEM_{oo}$ input laser beam, the beam diameter w should substantially coincide with the diameter of the back aperture 24. For more general beam profiles (such as Gauss-Laguerre) comparable conditions can be formulated.

In another system in FIG. 2 which includes some conventional features, the optical tweezer system 10 can translate the optical trap 33 across the field of view of the objective lens 20. A telescope 34 is constructed of lenses L1 and L2 which establishes a point A which is optically conjugate to the center point B in the prior art system of FIG. 1. In the system of FIG. 2 the light beam 12 passing through the point A also passes through the point B and thus meets the basic requirements for performing as the optical tweezer system 10. The degree of collimation is preserved by positioning the lenses L1 and L2 as shown in FIG. 2 to optimize the transfer properties of the telescope 34. In addition, the magnification of the telescope 34 can be chosen to optimize angular displacement of the light beam 12 and its width w in the plane of the back aperture 24 of the objective lens 20. As stated hereinbefore, in general several of the light beams 12 can be used to form several associated optical traps. Such multiple beams 12 can be created from multiple independent input beams or from a single beam manipulated by conventional reflective and/or refractive optical elements.

In one preferred embodiment of an overall optical manipulation system shown in FIG. 3, arbitrary arrays of optical traps can be formed. A diffractive optical element 40 is disposed substantially in a plane 42 conjugate to back aperture 24 of the objective lens 20. Note that only a single diffracted output beam 44 is shown for clarity, but it should be understood that a plurality of such beams 44 can be created by the diffractive optical element 40. The input light beam 12 incident on the diffractive optical element 40 is split into a pattern of the output beam 44 characteristic of the nature of the diffractive optical element 40, each of which emanates from the point A. Thus the output beams 44 also pass through the point B as a consequence of the downstream optical elements described hereinbefore.

The diffractive optical element 40 of FIG. 3 is shown as being normal to the input light beam 12, but many other arrangements are possible. For example, in FIG. 4 the light beam 12 arrives at an oblique angle β relative to the optic axis 22 and not at a normal to the diffractive optical element 40. In this embodiment, the diffracted beams 44 emanating from point A will form optical traps 50 in focal plane 52 of the imaging volume 32 (seen best in FIG. 1). In this arrangement of the optical tweezer system 10 an undiffracted portion 54 of the input light beam 12 can be removed from the optical tweezer system 10. This configuration thus enables processing less background light and improves efficiency and effectiveness of forming optical traps.

The diffractive optical element 40 can include computer generated holograms which split the input light beam 12 into a preselected desired pattern. Combining such holograms with the remainder of the optical elements in FIGS. 3 and 4 enables creation of arbitrary arrays in which the diffractive optical element 40 is used to shape the wavefront of each diffracted beam independently. Therefore, the optical traps 50 can be disposed not only in the focal plane 52 of the objective lens 20, but also out of the focal plane 52 to form a three-dimensional arrangement of the optical traps 50.

In the optical tweezer system 10 of FIGS. 3 and 4, also included is a focusing optical element, such as the objective lens 20 (or other like functionally equivalent optical device, such as a Fresnel lens) to converge the diffracted beam 44 to form the optical traps 50. Further, the telescope 34, or other equivalent transfer optics, creates a point A conjugate to the center point B of the previous back aperture 24. The diffractive optical element 40 is placed in a plane containing point A.

In another embodiment, arbitrary arrays of the optical traps 50 can be created without use of the telescope 34. In such an embodiment the diffractive optical element 40 can be placed directly in the plane containing point B.

In the optical tweezer system 10 either static or time dependent diffractive optical elements 40 can be used. For a dynamic, or time dependent version, one can create time changing arrays of the optical traps 50 which can be part of a system utilizing such a feature. In addition, these dynamic optical elements 40 can be used to actively move particles and matrix media relative to one another. For example, the diffractive optical element 40 can be a liquid crystal phase array undergoing changes imprinted with computer-generated holographic patterns.

Figure 5:
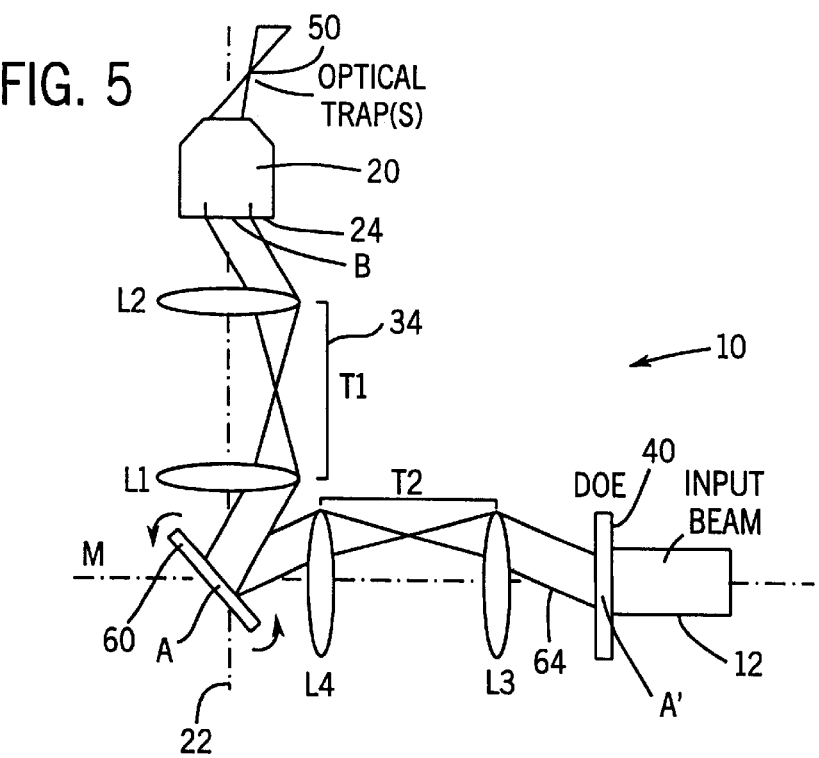
FIG. 5 illustrates a continuously translatable optical tweezer (trap) array using a diffractive optical element.

In another embodiment illustrated in FIG. 5, a system can be constructed to carry out continuous translation of the optical tweezer trap 50. A gimbal mounted mirror 60 is placed with its center of rotation at point A. The light beam 12 is incident on the surface of the mirror 60 and has its axis passing through point A and will be projected to the back aperture 24. Tilting of the mirror 60 causes a change of the angle of incidence of the light beam 12 relative to the mirror 60, and this feature can be used to translate the resulting optical trap 50. A second telescope 62 is formed from lenses L3 and L4 which creates a point A' which is conjugate to point A. The diffractive optical element 40 placed at point A' now creates a pattern of diffracted beams 64, each of which passes through point A to form one of the tweezer traps 50 in an array of the optical tweezers system 10.

In operation of the embodiment of FIG. 5, the mirror 60 translates the entire tweezer array as a unit. This methodology is useful for precisely aligning the optical tweezer array with a stationary substrate to dynamically stiffen the optical trap 50 through small-amplitude rapid oscillatory displacements, as well as for any application requiring a general translation capability.

The array of the optical traps 50 also can be translated vertically relative to the sample stage (not shown) by moving the sample stage or by adjusting the telescope 34. In addition, the optical tweezer array can also be translated laterally relative to the sample by moving the sample stage. This feature would be particularly useful for large scale movement beyond the range of the objective lens field of view.

Figure 6:
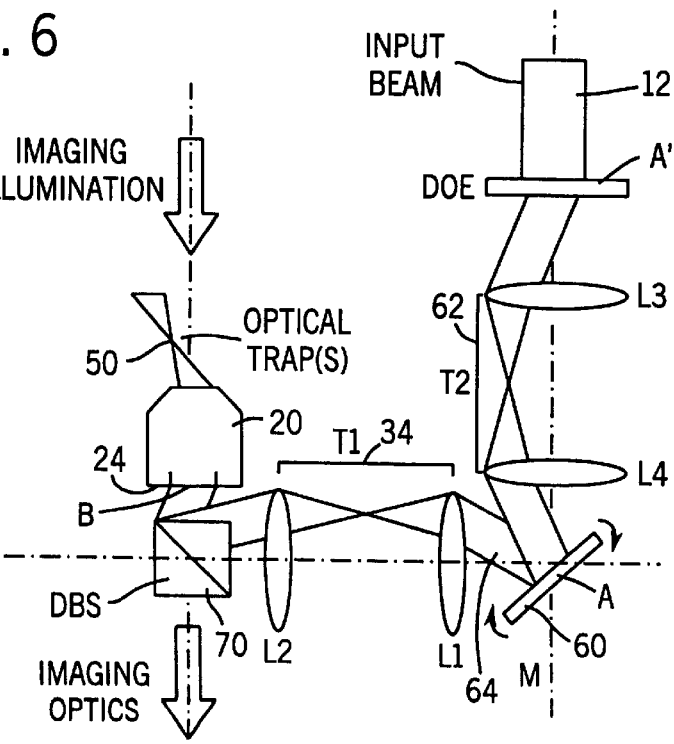
FIG. 6 illustrates a method and system for manipulating particles using an optical tweezer array while also forming an image for viewing the optical trap array.

In another embodiment shown in FIG. 6 the optical system is arranged to permit viewing images of particles trapped by the optical tweezers 10. A dichroic beamsplitter 70, or other equivalent optical beamsplitter, is inserted between the objective lens 20 and the optical train of the optical tweezer system 10. In the illustrated embodiment the beamsplitter 70 selectively reflects the wavelength of light used to form the optical tweezer array and transmits other wavelengths. Thus, the light beam 12 used to form the optical traps 50 is transmitted to the back aperture 24 with high efficiency while light beam 66 used to form images can pass through to imaging optics (not shown).

Figure 7A:
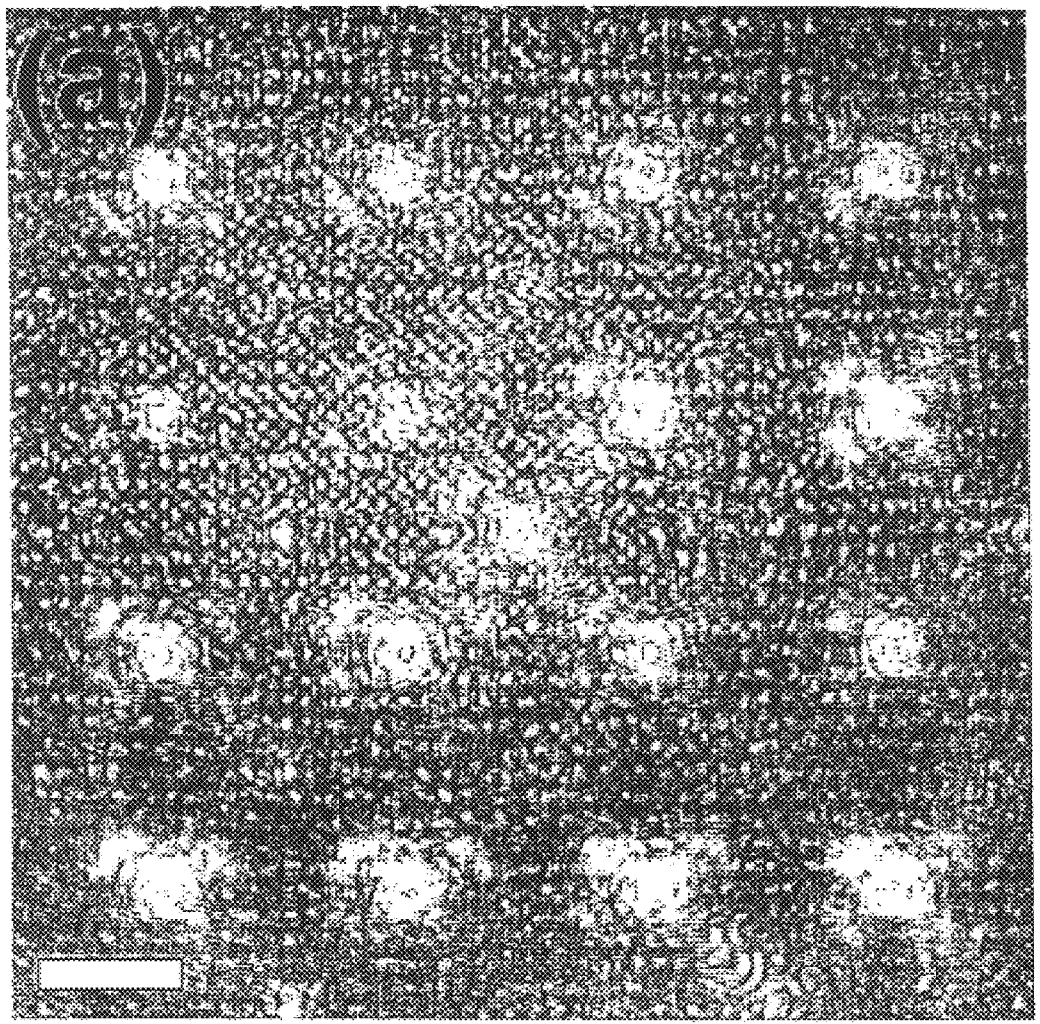
FIG. 7A illustrates an image of a four by four array of optical tweezers (traps) using the optical system of FIG. 6.
Figure 7B:
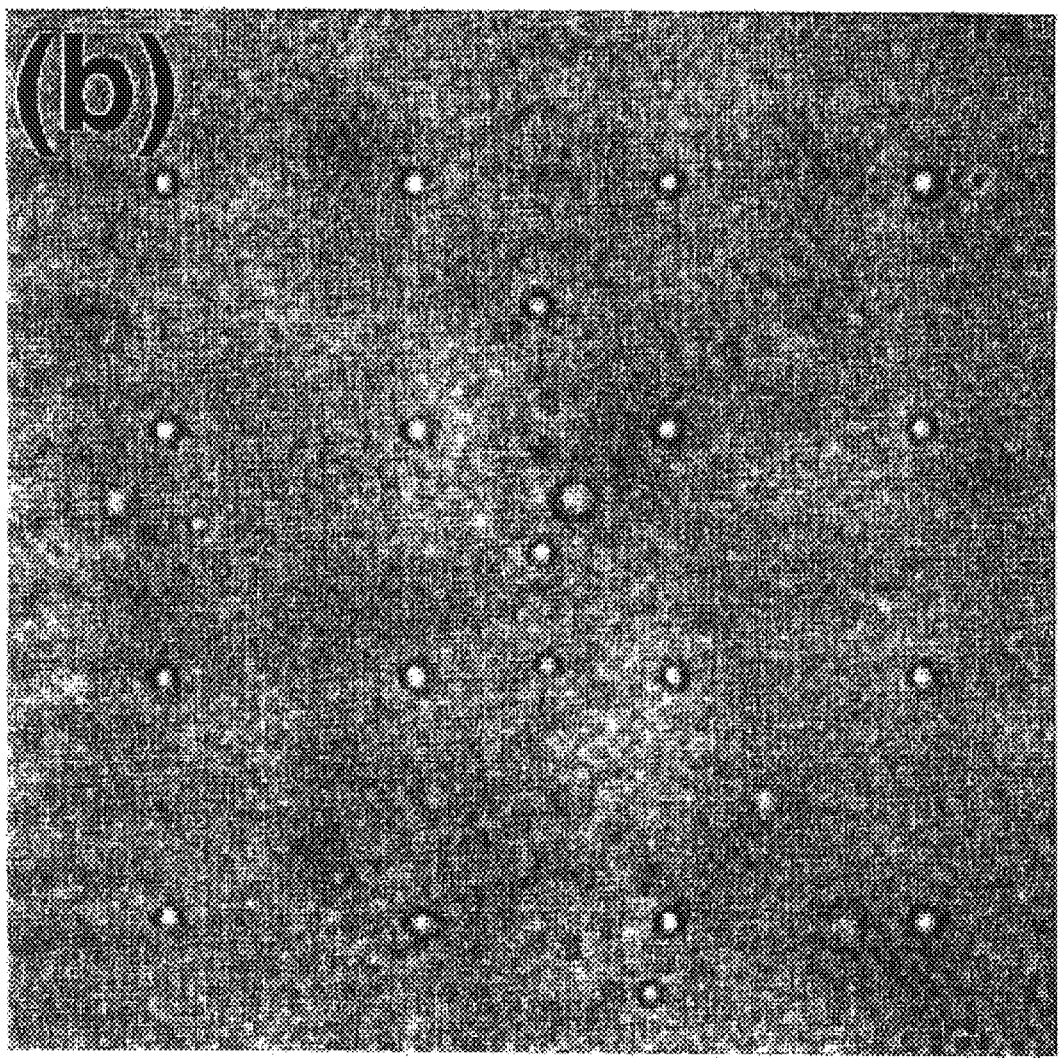
FIG. 7B illustrates an image of one micrometer diameter silica spheres suspended in water by the optical tweezers of FIG. 7A immediately after the trapping illumination has been extinguished, but before the spheres have diffused away.

An illustration of one application of an optical system is shown in FIGS. 7A and 7B. The diffractive optical element 40 is designed to interact with the single light beam 12 to create a 4×4 array of collimated beams. A 100 mW frequency doubled diode-pumped Nd: YAG laser operating at 532 nm provides a Gaussian $TEM_{oo}$ form for the light beam 12. In FIG. 7A the field of view is illuminated in part by laser light backscattered by sixteen silica spheres trapped in the array's sixteen primary optical tweezers 10. The 1 μm diameter spheres are dispersed in water and placed in a sample volume between a glass microscope slide and a 170 μm thick glass coverslip. The tweezer array is projected upward through the coverslip and is positioned in a plane 8 μm above the coverslip and more than 20 μm below the upper microscope slide. The silica spheres are stably trapped in three-dimensions in each of the sixteen optical tweezers 10.

In FIG. 7B is shown the optically-organized arrangement of spheres ⅟30 second after the optical tweezers 10 (traps) were extinguished but before the spheres had time to diffuse away from the trap site.

Adaptive Tweezer Mode

In various embodiments the basic optical trap modes described hereinbefore can be used in various useful methodologies. Furthermore, other embodiments include apparati and systems which can be constructed to apply these methods to enhance operation and use of the optical traps. In particular, the optical traps can be controlled and modified, and various embodiments employing these features are described hereinafter.

A variety of new uses and applications of optical traps can arise from time varying construction and dynamic change of optical trap configuration. In one form of the invention an array of optical traps can be advantageously manipulated in the manner shown in FIG. 8. In the illustrated optical system 100, the diffractive optical element 102 splits the collimated laser beam 104 into several (two or more) laser beams 106 and 108. Each of the several laser beams 106 and 108 are transferred into a separate optical trap in an object plane 118. Each of these several laser beams 106, 108 are transferred to the back aperture 110 of the objective beam 112 by action of a conventional optical arrangement, such as the telescope formed by the laser 114 and 116. The objective lens 112 focuses each of these several beams 106, 108. In a preferred form of the invention a movable knife edge 120 is disposed to be movable into the path of the several laser beams 106, 108, thereby enabling selective blocking of any selected one(s) of the several laser beams to selectively prevent formation of a portion of the optical traps. Such a methodology and structure enables construction of any desired array of optical traps by use of appropriately designed knife edges or apertured knife edge structure and like such structures.

Figure 9A:
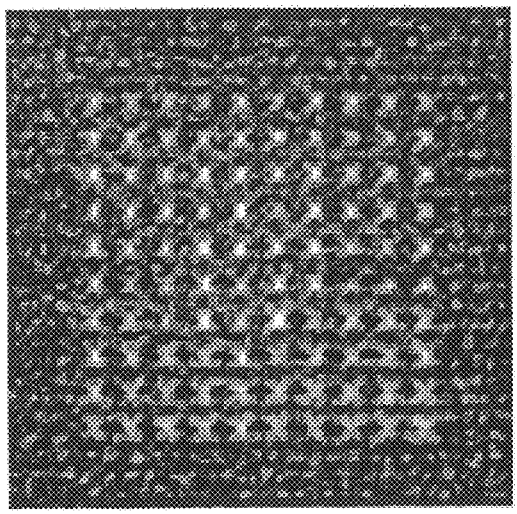
FIGS. 9A–9D illustrate the use of optical trap control methodology wherein the optical traps are formed by a holographic diffractive optical element.
Figure 9B:
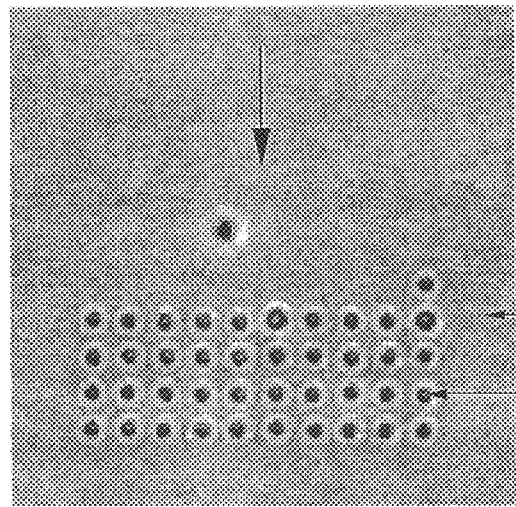
Figures 9C, 9D:
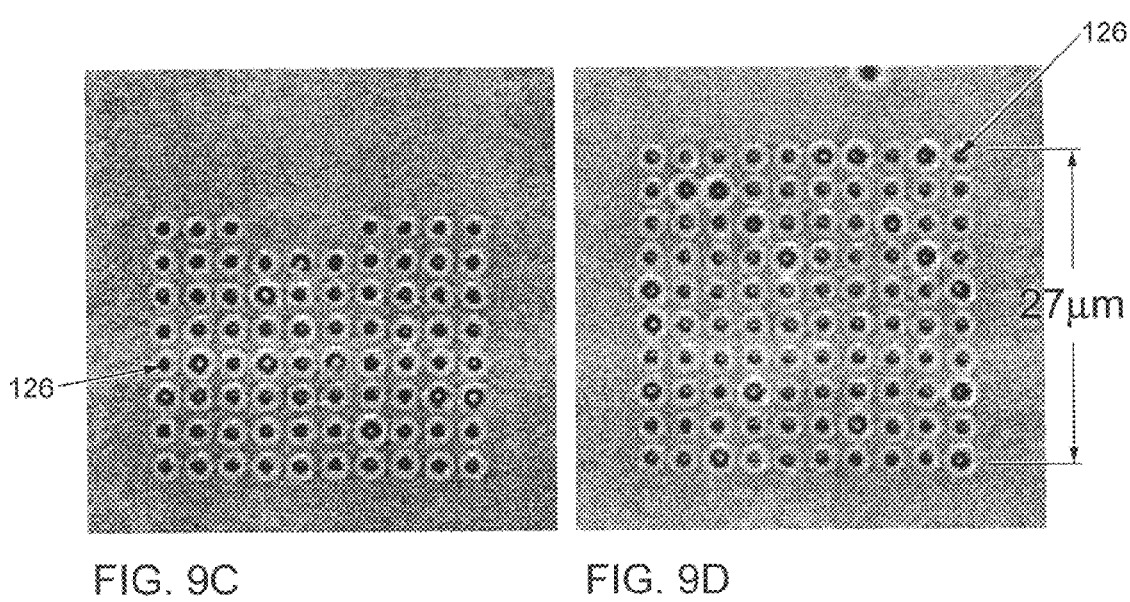

An illustration of the use of such optical trap control methodology is shown in FIG. 9 wherein optical traps are formed by a holographic form of diffractive optical element 122. The movable knife edge 120 of FIG. 8 can block all but one line 124 of its optical traps, and by systematically moving the knife edge 120, each of the lines 124 can be established. This enables systematic filling of optical traps 132 with particles 126. This methodology allows filling of the optical traps 132 with a variety of different types of the particles 126 and also avoids the typical problem of the particles 126 tending to fill preferentially the outer portions of an array of optical traps. Such preferential filling can block filling of the inner optical traps. This controlled formation of the optical traps also permits precision formation and change of optical trap arrangements.

Figure 10:
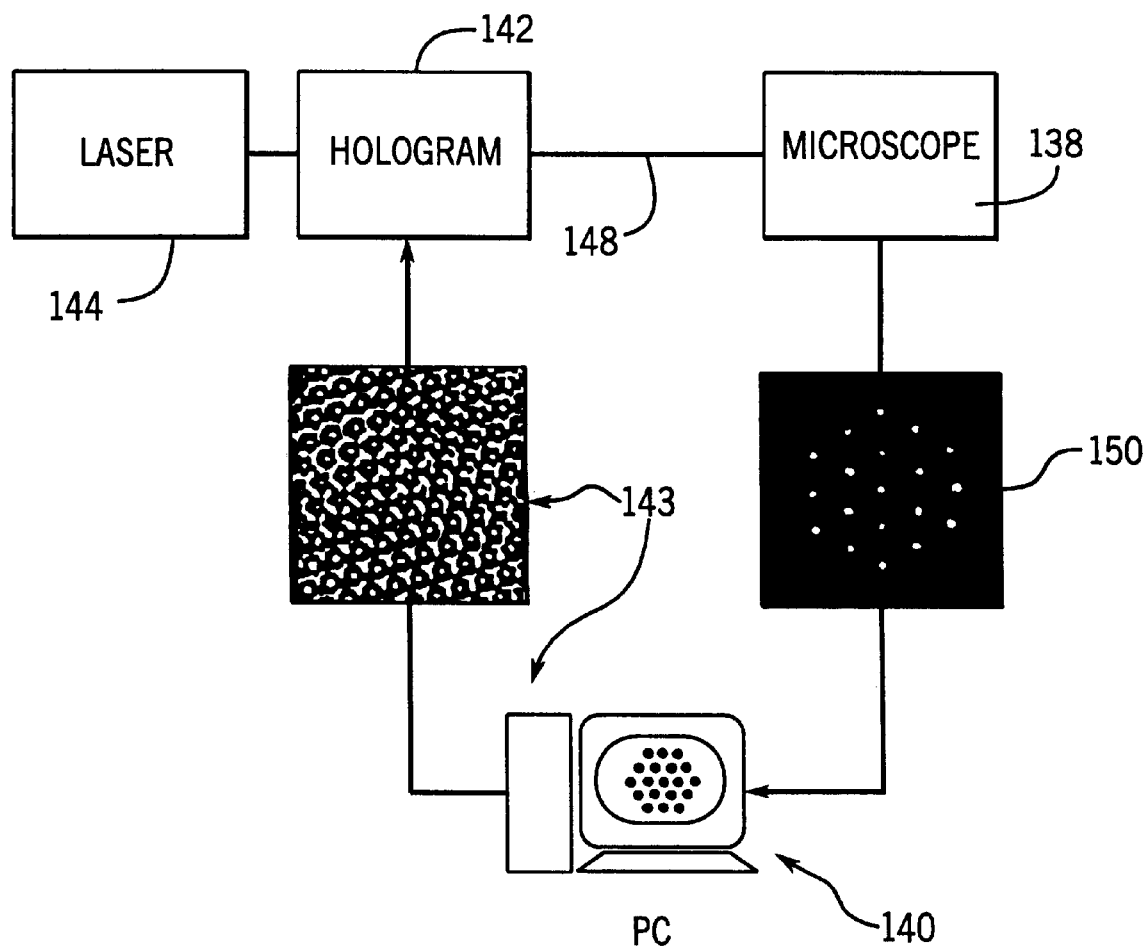
FIG. 10 illustrates the use of optical trap control methodology wherein a microscope images the particles and a personal computer is used to identify the particles and calculate a phase only hologram to trap the particles.

In addition to exerting detailed control over filling of an array of the optical traps 132, devices can be provided to accelerate filling of the optical traps. For example, in FIG. 8 is shown a functional block 128 indicative of a device to (1) output selected particles 126 (see FIG. 10), (2) apply the particles 126 under pressure differential (through electrophoresis or electro-osmosis), (3) apply a temperature gradient and (4) translate the entire optical trap array through a suspension containing the particles 126 in a manner like a fishing net. Experimentation has determined the particles 134 can be filled into the optical traps 132 starting with a particle concentration of about $10^{-4}$ $\mu m^{-3}$ and a reasonable flow rate of about 100 $\mu$m/sec to fill one row of the line 124 or an array pattern in about one minute of time. A fully developed array of the particles 126 can be made permanent by transferring the array onto a substrate or by gelling the fluid which is suspending the particles. Such a procedure also can allow construction of a large variety of different particle arrays and coupled arrays of the particles 126. Using the previously-described characteristics and functionalities of the optical traps 132, each of the particles 126 can also be further interrogated, imaged and manipulated for operational uses and investigative purposes.

In yet another embodiment the optical traps 132 can be dynamically changed responsive to a specific optical requirement, which can be effected by use of a computer program with desired instructional information such that one or more of the optical traps 132 can be used to modify, remove, or add particles at various optical trap sites or allow various manipulations of a single object. Further, one or more of the optical traps 132 can be moved and their character changed (such as changing the shape or strength of the trap) for dynamic manipulation of any object, such as a cell of a plant or animal. This can be particularly advantageous when manipulating a delicate structure or when there is need to perform complex manipulations of an object. Heretofore, such objects were handles by a single brute force trap which could cause damage to the object or not provide the degrees of freedom often needed to perform a desired function.

In addition, in another process the particles 126 can be dynamically sorted by size. One can also image an array of the particles 126 in the manner shown in FIG. 10. A microscope 138 can image the particles 126, and a personal computer 140 can identify the particles 126 and calculate a phase only hologram 142 (for the diffractive optical element 144 of FIG. 8) to trap said particles. A computer controlled spatial light modulator 143 can then implement the computer designed hologram 142 by causing application of a pattern of phase modulations to the laser beam 144. This can also be dynamically varied for any of a variety of purposes. The modified laser beam 148 (also see the several laser beams 106, 108 in FIG. 8) are focused by the microscope to create an array of the optical traps 132 (also known as tweezers) which traps the particles 126 on image screen 150. Each of the particles 126 can then be individually manipulated to assemble a desired structure to sort the particles 126 or to otherwise manipulate, inspect or alter the shape of the object of interest.

Use of Light in the Visible and UV Spectrum

In a preferred embodiment of the invention, visible light tweezers can be used advantageously. In other forms of the invention, for particular sizes of materials matched to ultraviolet light or for uses which are less sensitive to ultraviolet light, the invention can also be expanded to wavelengths shorter than visible light, including ultraviolet light. Heretofore, tweezers for use in living biological material have been formed from infrared light for the reasons described hereinbefore. Optical tweezers in general can damage biological systems through at least three principal mechanisms: (1) mechanically disrupting physical interconnections; (2) heating; and (3) in the case of biomaterials, photochemical transformation of biomolecules (these are merely exemplary mechanisms and other mechanisms are possible). The first mechanism includes processes such as drawing into the optical trap the phospholipids constituting a membrane and then expelling them as micelles or vesicles. Such processes are inherent in the operation of optical tweezers and do not depend on the wavelength of light being used. These destructive processes can be minimized by using the least possible and most efficient trapping force for a given application. Heating results from absorption of the optical trapping photons, as typified by the destruction of hemoglobin-rich red blood cells by green laser light. Most biological materials, however, are essentially transparent to visible light and in fact absorb more strongly in the infrared. For example, water has an absorption coefficient of about $\mu_a = 3 \times 10^{-4}$ cm$^{-1}$ at $\lambda = 500$ nm (visible range) compared with $\mu_a = 0.1$ cm$^{-1}$ at $\lambda = 1$ $\mu$m (infrared range). Infrared based optical traps should therefore heat water some 300 times more efficiently than visible light based traps. The difference is far less pronounced for other components of biological systems. For example, most proteins and polysaccharides have molar absorption coefficients of: $\mu_a \approx 0.1$ cm$^{-1}$/M for visible light and $\mu_a \approx 0.01$ cm$^{-1}$/M for infrared radiation. Hemoglobin is an exception, with a comparatively enormous molar absorption coefficient of $\mu_a \approx 10^4$ cm$^{-1}$/M in the visible light part of the spectrum. In the absence of such a strong absorption condition, visible light should lead to no worse heating than infrared, and indeed may well be preferable because of the prevalence of water in biological systems.

Photochemical transformations proceed either through resonant absorption of one or more photons to a discrete molecular state, or through non-resonant absorption to a broad molecular band. Most relevant resonant transitions take place in the infrared (for vibrational transitions) to the visible (for electronic transitions). Most relevant resonant transitions depend so strongly on the frequency of light, however, that they are highly unlikely to be driven by the monochromatic light from any particular infrared or visible laser. Transitions to broad bands take place mostly in the ultraviolet end of the optical spectrum and so should not be driven either by infrared light or by visible light.

"Opticution" (described hereinbefore) is believed to be driven principally by photochemistry, rather than by heating or mechanical disruption, and thus it is important to understand why visible (or ultraviolet in some cases) optical tweezers can result in deleterious effects on biological and other materials having similar photochemistry responses (or other optically driven events which lead to deleterious effects in any type of material, such as light sensitive chemical states, light sensitive electronic states or even sensitive mechanical structures at the microscopic level). Such materials can include, for example, small molecule drugs, doped semiconductors, high temperature superconductors, catalysts and low melting point metals.

For example, living organisms' resistance to photochemical degradation at visible wavelengths would appear to be a natural byproduct of their evolution in sunlight. However, the flux of visible light from the sun is smaller than that in a typical 1 mW optical tweezer by some six orders of magnitude. The intense illumination at the focal spot of an optical tweezer greatly increases the rate of multiple-photon absorption in which two or more photons cooperate to drive a single optical transition. Multiple photon events require photons to arrive simultaneously, and so the level of occurrences of such events depend strongly on the light intensity. The strong focus of an optical trap does indeed provide the high-intensity light environment needed to drive such multiple photon processes.

Multiphoton absorption can be more damaging in visible tweezers than in infrared due to the simultaneous absorption of two visible photons which delivers the equivalent energy of a single ultraviolet photon. Likewise this can be extended to ultraviolet photons having wavelengths in which two or more such photons are required to deliver light energy which would alter the chemical, biological, electronic or mechanical state of a material. Two-photon absorption of infrared light, on the other hand, delivers the equivalent energy of a visible photon and therefore does not usually suffice to drive photochemical or like optical transformations. Achieving relevant photochemistry events with infrared light would therefore require three- or even four-photon absorption. Because higher-order absorption processes are less likely than lower order processes, visible optical tweezers appear to be more likely than infrared tweezers to induce deleterious photochemistry, such as chromosome recombinations in biological materials. This is believed to be the mechanism by which tightly focused pulses of light at $\lambda$=532 nm form an optical scalpel capable of precisely cutting chromosomes.

The approximate rate $W_n$ of an n-photon absorption in the focal volume of an optical tweezer should scale as follows:

$$W_n \propto \left(\frac{P}{\hbar c}\frac{\sigma}{\lambda}\right)^n,$$

where P is the power in the beam and $\sigma$ is the photon capture cross-section for the absorber. As is shown by the above equation, lower-order processes at shorter wavelengths occur much more frequently than higher-order processes at longer wavelengths, at least for beams of equal power.

Optical tweezers, however, are far more efficient when created with light of shorter wavelengths than infrared light (e.g., visible and in some cases ultraviolet). As a result, such optical tweezers require much less power to match the trapping force of infrared tweezers. This comparative advantage of such tweezers opens the door to their use for micromanipulation of biological materials (and for any other highly light sensitive materials as described hereinbefore). The magnitude of the optical gradient force drawing dielectric material to the focus of an optical trap scales roughly with the inverse fourth power of $\lambda$ in the Rayleigh approximation:

$$F \propto \frac{P}{\lambda^4},$$

Therefore a visible trap operating at, for example, $\lambda$=532 nm requires only $\frac{1}{16}$ the power to achieve the same trapping force as an infrared trap operating at $\lambda$=1064 nm. The relative reduction in power immediately translates into a reduction in the rate $W_2$ of two-photon absorption events for the visible trap. Therefore, the likelihood of substantial damage is drastically reduced and can even enable infliction of virtually no damage to the subject material. Furthermore, by careful selection of the wavelength of light used (visible or even ultraviolet in some cases), absorption windows of a material being inspected can be used to select the wavelength of light to reduce the absorption of light and thereby reduce the damage or alteration of the material.

The trapping efficiency of an optical tweezer can be increased still further, and the power requirements correspondingly reduced, by appropriately shaping the wavefront of the trapping beam. For example, it has previously been demonstrated that an optical trap constructed from a donut-mode laser beam whose intensity vanishes at the optical axis requires far less power to achieve the axial trapping force of a conventional optical tweezer formed with a Gaussian $TEM_{oo}$ mode. While it is clear that shaping the wavefront can improve trapping efficiency, thereby reducing two-photon absorption, no studies have reported an optimal wavefront profile. Therefore, still further improvements are available with engineering of the trapping wavefront's characteristics.

While the time-averaged power establishes the trapping force of an optical tweezer, its peak power sets the rate of occurrence of two-photon processes. Consequently, continuous-wave visible optical tweezers should also be less damaging than traps derived from pulsed lasers.

The local irradiation, and thus the rate of two-photon processes, can be reduced still further by applying multiple separate traps to a system, as described hereinbefore, rather than just one trap. Distributing the trapping force on an extended sample among N optical tweezers therefore reduces $W_2$ by a factor of N.

A system (biological or otherwise) with discrete photosensitive components can be further trapped with visible (or ultraviolet in some cases) light tweezers, provided that care is taken to position the light traps away from sensitive areas of the subject material.

Further, some samples, such as many biological materials, absorb light strongly in the visible range and therefore cannot be trapped with visible optical tweezers. For the great number of systems largely transparent to visible light, various steps can be used to minimize the rate of deleterious nonlinear optical processes. Without limitation, these can include:
1. Given a choice of a range of visible light wavelengths, one can avoid the use of light wavelengths associated with strong absorptions characteristic of the type of material.
2. One can create traps with a continuous-wave (CW) laser, rather than with a pulsed laser.
3. One can trap an extended sample at multiple points, rather than at just one.

4. One can make each trap as efficient as possible. For example, one can take advantage of wavefront shaping to minimize the power required to achieve a desired trapping force.

The concepts of creating traps with a continuous-wave (CW) laser and avoiding those associated with strong absorptions can be applied generically to all optical tweezer systems. Trapping extended samples at multiple points and maximizing the efficiency of each trap, however, could be more difficult to implement in conventional optical tweezer systems, but are well within the domain of intended uses of holographic optical tweezers. In particular, holographic optical tweezers ("HOTs") can create an arbitrary number N of optical traps in arbitrary positions so as to trap an extended biological sample (or other highly light sensitive material) at multiple points. The simplest of these multiple trapping patterns also could be created by rapidly scanning a single tweezer among the desired array of traps. This can be particularly useful in biological samples, or other highly light sensitive materials, since not all of the power needs to be imparted on a single point of the sample. By instead distributing the power over a number of points, the overall damage to the sample will be significantly reduced in a manner similar to a "bed of nails." Achieving a desired time-averaged trapping force in each of the N scanned traps, however, would require N times the peak power in each trap. Consequently, HOTs have an inherent advantage over scanned tweezers when it comes to trapping materials non-destructively.

HOTs also can produce more complex continuously evolving patterns of traps than can scanned-tweezer systems. This would be an advantage if optical tweezer manipulation is intended to move or sort biological or highly light sensitive materials.

Holographic optical tweezers also can tailor the wavefronts of the individual beams making up the array of traps and can direct each beam accurately into the trapping system's focusing optics. Consequently, optical tweezers formed with a HOT system can dynamically minimize the amount of power needed to achieve a desired trapping force.

The above qualitative example guidelines can be used for minimizing the rate of radiation or other light initiated damage inflicted on biological systems (or other highly light sensitive materials) by optical trapping with visible light. By following these guidelines, it is possible to obtain acceptable small rate of damage for a particular application. The use of visible light in an HOT system would therefore have at least several advantages for applications to biological systems:

Optical efficiency. Microscope objective lenses suitable for forming optical tweezers typically are optimized for use at visible and ultraviolet wavelengths and suffer from a variety of defects when used to transmit infrared light. Trapping with visible light thus takes optimal advantage of the designed properties of conventional optics. Infrared systems, by contrast either must use more costly special-purpose optics, or else will suffer from optical aberrations which will somewhat diminish their potential benefits relative to visible trapping systems.

Safety. The human visual system includes a protective blink reflex which reduces the chance that a stray beam of light from a visible trapping system could damage a user's eyesight. No such reflex protects a user's vision in the infrared.

Ease of alignment. Visible optical trains are much easier to align than infrared.

Availability of two-photon processes. Two-photon processes can be useful in some biological applications, for instance in creating optical scissors and scalpels. The same optical train which creates damage-minimizing configurations of visible optical traps can be reconfigured in real time to produce individual beams optimized for two-photon absorption, but with maximum power usage efficiency. Thus the same system could trap, cut, and generally induce photochemical transformations in its samples using a single laser for excitation to for one or a matrix of optical traps.

Reduced heating. Infrared systems probably heat their samples through direct absorption by water to a greater extent than do visible systems. This excess heating could explain some of the damage reported in infrared trapping experiments on living systems.

Improved trapping accuracy. The trapping volume of an optical tweezer scales with the wavelength of light. Visible light therefore can trap more accurately localized regions than infrared.

Improved tracking accuracy. Optical traps sometimes are used to track the motions of trapped objects, for instance through the time evolution of the light scattered by trapped particles into the far field. The resolution of such tracking techniques scales with the wavelength of light and thus would be improved with traps formed in visible light relative to infrared.

It is also possible that a variety of biological and also nonbiological materials can be manipulated in a manner described above with varying wavelengths, laser types, and experimental conditions. The particular parameters that are used will be dependent upon the material to be manipulated and the optical, chemical, mechanical and electrical states which are sensitive to light. More particularly for example, the absorption characteristics of the material at certain wavelengths in the visible range may have a significant bearing on the wavelength of the laser beam used for the manipulation. For example, the use of certain types of green laser light can be successfully used with certain materials but not with others (such as chloroplasts in certain types of plants). For nonbiological materials, such as electronic devices, one can select visible light wavelengths which do not exhibit strong absorption by the components of the device.

It is also noted that the visible portion of the spectrum has often been considered to be in the range of about 400 nm to about 700 nm. It is possible, however, that a broader wavelength range could be used in accordance with the broader aspects of the invention. For example, the window of transparency for water is between about 200 nm and about 800 nm, and an even larger range could be used in certain situations.

The following non-limiting examples demonstrate the efficacy of visible optical tweezers for manipulating living biological samples. In particular, we have demonstrated long-term trapping using light at $\lambda=532$ nm using a frequency-doubled Nd:YVO$_4$ laser.

EXAMPLE I

Large numbers of yeast cells (generic varieties from a package of Fleischman's Yeast) have been trapped in culture medium and have observed several generations of budding during continuous illumination. During these tests, light having a wavelength of 532 nm from a frequency-doubled Nd:YV O$_4$ laser was used to trap the yeast cells. The yeast included various strains of *S. cerevisiae* in aqueous solution at room temperature. Individual cells were trapped with about 1 mW of continuous-wave laser light. In one demonstration, sixteen cells were confined to a four by four array. Of these sixteen cells, about half appeared to be budding daughter cells and forming colonies after six hours.

EXAMPLE II

Light having a wavelength of 532 nm from a frequency-doubled Nd:YV $O_4$ laser was used to trap a plurality of cheek epithelial cells. Swabbed cells were suspended in aqueous solution at room temperature and deposited onto glass cover slips. Optical tweezers were trained on the nuclei and vacuoles of various cells for up to ten minutes. When regions of the cell membrane were trapped strongly enough to displace a suspended cell through its culture medium, its internal processes did not appear to be significantly, as determined by visual inspection. Normal cell function appeared to resume after the tweezers were extinguished.

EXAMPLE III

Light having a wavelength of 532 nm from a frequency-doubled Nd:YV $O_4$ laser was used to trap wheat chancre cells. The cells were obtained in solid medium and deposited onto glass cover slips before optical trapping at room temperature. Continuous optical trapping was not sufficient to disrupt the cell wall. Visual inspection of illuminated cells provides qualitative results similar to those obtained with cheek epithelial cells.

While preferred embodiments of the invention have been shown and described, it will be clear to those skilled in the art that various changes and modifications can be made without departing from the invention in its broader aspects as set forth in the claims provided hereinafter.

What is claimed is:

1. A method of manipulating a material using a focused beam of laser light, comprising the steps of:
   providing a focused beam of laser light in a wavelength range less than the wavelength range for infrared light to form conditions for an optical trap;
   passing the laser light through a diffractive optical element to create a plurality of laser beams;
   optically focusing the plurality of laser beams to create a plurality of optical traps;
   applying the plurality of optical traps to the material for manipulating discrete portions of the material; and
   controlling power level of each of the optical traps so as to avoid substantial damage to the material.

2. The method of claim 1, wherein the focused beam of laser light is selected from the group consisting of the visible and ultraviolet wavelength ranges.

3. The method of claim 1, further including the step of using laser light with a wavelength to match an absorption window in the material so as to minimize light absorption.

4. A method of manipulating a material using a focused beam of laser light and forming at least one optical trap from the laser light and using the optical trap to manipulate the material, comprising the steps of:
   providing a continuous wave, focused beam of laser light having a wavelength outside the infrared wavelength region such that the material possesses a weak absorption coefficient in the wavelength range of the laser light;
   providing at least one optical trap for manipulating the material; and
   controlling the power level of the at least one optical trap and also controlling the weak absorption coefficient of the material to avoid substantial alteration of the material being manipulated by the at least one optical trap of the material for the wavelength range of the laser light.

5. A method of manipulating a material using a focused beam of laser light, comprising the steps of:
   providing a beam of laser light in a wavelength range less than the wavelength range for infrared light, the beam of laser light forming conditions for an optical trap;
   passing the laser light through a diffractive optical element to create a plurality of laser beams;
   optically focusing the plurality of laser beams to create a plurality of optical traps;
   applying the plurality of optical traps to the material for manipulating the material; and
   controlling power level of at least one of the optical traps so as to avoid substantial damage to the material.

6. The method of claim 5, wherein the focused beam of laser light is selected from the group consisting of the visible and ultraviolet wavelength ranges.

7. The method of claim 5, further including the step of using laser light with a wavelength to match an absorption window in the material so as to minimize light absorption.

8. A method for forming at least one optical trap from a continuous-wave focused beam of laser light and using the at least one optical trap to manipulate a material, comprising the steps of:
   providing the continuous-wave, focused beam of laser light having a selected wavelength less than the infrared wavelength region and also selecting the wavelength of the laser light such that the material possesses a weak absorption for the selected wavelength of the laser light;
   providing the at least one optical trap for manipulating the material; and
   controlling power level of the at least one optical trap and also controlling absorption by the material by the weak absorption coefficient so as to avoid substantial alteration of the material being manipulated by the at least one optical trap of the material for the selected wavelength of the laser light.

9. A method of manipulating a biological material using a focused beam of laser light, comprising the steps of:
   providing a focused beam of laser light with a selected wavelength in a range shorter than the infrared light range to form conditions for an optical trap, the laser light having the selected wavelength such that the biological material exhibits a low absorption coefficient in the selected wavelength range which permits manipulation without substantial damage to the biological material;
   providing a plurality of the optical traps with the focused beam of laser light for the selected wavelength in the range shorter than the infrared range, the plurality of optical traps manipulating the biological material; and
   controlling the power level of the optical traps, the laser light with the selected wavelength and the resulting absorption coefficient to avoid substantial damage to the biological material while manipulating the biological material.

10. The method of claim 9, wherein the focused beam of laser light includes light in the wavelength range of about 400 nm to about 700 nm.

11. The method of claim 9, wherein the beam of light comprises a continuous-wave laser beam.

12. The method of claim 9, further comprising the step of shaping the wavefront of the focused beam of light such that the power required to achieve a predetermined trapping force is reduced relative to a focused beam of light that has not been shaped.

13. The method of claim 12, wherein the beam of light comprises a donut mode.

14. The method of claim 9, wherein the plurality of optical traps arise from a diffractive optical element.

15. The method of claim 9, wherein the power level of each of the plurality of optical traps is controlled to avoid altering the genetic code by a biologically relevant amount for the biological material.

16. A method of manipulating a biological material using a focused beam of laser light, comprising the steps of:

providing a continuous-wave, focused beam of laser light having a selected wavelength in a range shorter than an infrared range and that the biological material possesses a weak absorption coefficient for the selected wavelength of laser light;

providing at least one optical trap for manipulating a discrete portion of the biological material; and controlling the power level of the at least one optical traps in conjunction with the biological material having the weak absorption coefficient for the selected wavelength in the range shorter than the infrared range to avoid alteration of a relevant portion of genetic code by a biological significant amount during manipulating the biological material.

17. The method of claim 16, wherein a plurality of the optical traps are formed with the focused beam of laser light, wherein each of these traps manipulates a discrete portion of the material.

18. The method of claim 17, further comprising the step of shaping the wavefront of the focused beam of light such that the trapping efficiency of the at least one optical trap is increased relative to not shaping the focused beam of light.

19. The method of claim 18, wherein the focused beam of light comprises a shape calculated to minimize absorption by the material.

20. The method of claim 17, wherein each trapping location is not at a biologically sensitive location in the biological material.

21. A system for manipulating a biological material using a focused beam of laser light, comprising:

a focused beam of laser light having a selected wavelength less than the minimum wavelength of infrared light, the focused laser light forming an optical trap and having a wavelength such that the biological material possesses a weak absorption coefficient for the selected wavelength of the laser light used to manipulate the biological material; and a plurality of the optical traps for manipulating discrete portions of the biological material, wherein the power level of the optical traps is controlled and along with the weak absorption coefficient of the biological material for the laser light selected wavelength which enables avoiding at least the alteration of the genetic code of a biologically significant mount of the biological material.

22. The system of claim 21, wherein the focused beam of laser light is selected from the visible and ultraviolet wavelenth range.

23. The system of claim 21, wherein the focused beam of laster light comprises a continuous-wave laser beam.

24. The system of claim 23, wherein the wavefront of the focused beam of laser light shaped to achieve a predetermined trapping force is reduced relative to a focused beam of light that has not been shaped.

25. The system of claim 21, wherein the plurality of optical traps comprise holographic optical traps.

* * * * *